United States Patent

Wilson

[15] 3,680,055

[45] July 25, 1972

[54] BUFFER MEMORY HAVING READ AND WRITE ADDRESS COMPARISON FOR INDICATING OCCUPANCY

[72] Inventor: Roy A. Wilson, Monrovia, Calif.

[73] Assignee: Burroughs Corporation, Detroit, Mich.

[22] Filed: July 6, 1970

[21] Appl. No.: 52,514

[52] U.S. Cl. ....................340/172.5

[51] Int. Cl. ....................G06f 13/06

[58] Field of Search ....................340/172.5, 173

[56] References Cited

UNITED STATES PATENTS

| | | | |
|---|---|---|---|
| 2,907,004 | 9/1959 | Kun Li Chien et al. | 340/172.5 X |
| 3,012,230 | 12/1961 | Galas et al. | 340/172.5 |
| 3,541,531 | 11/1970 | Iwersen et al. | 340/173 |
| 2,817,072 | 12/1957 | Kun Li Chien et al. | 340/172.5 X |
| 3,059,221 | 10/1962 | Page et al. | 340/172.5 |
| 3,302,185 | 1/1967 | Cox, Jr. et al. | 340/172.5 |
| 3,421,147 | 1/1969 | Burton et al. | 340/172.5 |
| 3,540,010 | 11/1970 | Heightley et al. | 340/173 |

*Primary Examiner*—Paul J. Henon
*Assistant Examiner*—Sydney R. Chirlin
*Attorney*—Christie, Parker & Hale

[57] ABSTRACT

A buffering system has a memory with a plurality of addressable storage locations, an address register for writing, a separate address register for reading, and occupancy determining circuitry which develops indicating signals useful in controlling the flow of data through the buffer. Among these useful signals are attention needed signals, next word occupied signals and overflow signals for notifying a receiving device of the type of action that is appropriate in reading data from the buffer.

7 Claims, 3 Drawing Figures

INVENTOR
ROY A. WILSON

BY

Christie, Parker & Hale
ATTORNEYS

BUFFER MEMORY HAVING READ AND WRITE ADDRESS COMPARISON FOR INDICATING OCCUPANCY

BACKGROUND OF THE INVENTION

1. Field of the Invention

This invention relates to digital data handling systems and, in particular, relates to a memory system for buffering data transmission between transmitting and receiving devices.

2. Description of the Prior Art

Problems arise in transferring digital data from one device to another because the two devices may not always be ready to communicate with one another at the same time. For example, in data processing systems there may be many different input devices such as disks, tapes, check sorters and the like which are transmitting a series of data characters to a common receiving device within the system. The receiving device may be the central processor of the system, a special input/output control unit such as a multiplexor or a small processor designed to handle data communication tasks of the system. In any event the common receiving device must time share its receiving facilities among the several transmitting devices that it services. Since it is time sharing these facilities there will be time intervals during which the receiving device is not ready to communicate with a particular transmitting device that is ready to transmit a data character. It is therefore a common practice to include a buffer register in the interface between each transmitting device and the receiving device. The buffer register serves as a memory to store data obtained from the transmitter until such time as the receiving unit is ready to communicate with that interface. In some applications it can be predicted in advance that the transmitting device will occasionally transmit several data characters before the receiving device is ready. In such applications more buffer registers have been added to provide additional storage. In the typical multi-register buffer the receiving device will service an interface only when all of the registers in the buffer become filled. Thus, the receiving device accepts the spill-over of data after all buffer registers have been filled. Since the receiving device accepts data only after the buffer registers are full, there can be an undue delay in the transmission of the data. For example, if the transmitting device has transferred data only once to the multi-register buffer when the receiving device is ready to service the interface the receiving device will find the buffer not full and pass on to examine another interface. Therefore the data in one of the buffer registers must remain there until the receiving device is again ready to service the interface. Furthermore, the fact that the receiving device has ignored this interface and left the buffer partially occupied increases the likelihood of an overflow of the buffer.

Buffer registers are also used in transmitting data from non-real time or holdable devices. For example, a data processor may produce data to direct a printer to print out the results of some computation. Typically the processor can be made responsive to a ready or hold indicator signal such that it will supply data to an interface when the interface is ready or it will hold the data if the interface is not ready. Providing a buffer register between the processor and the printer can reduce the number of times that the processor has to hold its output data because the printer is not yet ready to accept it. Here again the buffer registers used in the past have been completely filled by the processor before the printer receives the data first transmitted.

SUMMARY OF THE INVENTION

The present invention is directed to a buffer memory system adapted to produce indicating signals reflecting the occupancy status of the buffer memory that are useful in controlling the transmission of information characters through the buffer.

Briefly, one embodiment of the present invention comprises a memory having a plurality of addressable locations, an input for coupling information units comprising data received from a real time source into addressed locations, an output for coupling stored information units to a receiving device on a first-in, first-out basis when demanded, and occupancy indicating circuitry operable to notify the receiving device that the memory contains information that has not yet been demanded.

In another embodiment of the present invention, information units supplied by a non-real time or holdable source can be buffered and the occupancy indicating signals can be used to notify the source when the memory has unoccupied locations available for buffering.

In a preferred embodiment of the present invention, write counting means and read counting means each count in a prefixed sequence of states to select buffer locations into which information units are to be written and from which information units are to be read. A combinatorial network of gates is coupled to these counters and in response to a predetermined relative state therebetween provides an indication that at least one information unit is ready to be read. Thus the occupancy indicating signals can be formed by relatively inexpensive gates and it is not necessary to employ more expensive structures such as up down counters and decoding networks for this purpose.

A feature of the present invention is that the buffer memory is elastic in that it provides only as much temporary storage as is made necessary by the current environment. That is, the number of information units that need to be held in the buffer memory changes depending upon the availability of access to the receiving device. It is not necessary to wait for all locations of the memory to be filled before transmitting to the receiving device.

Another feature of an embodiment of the present invention is the provision for assigning a priority to the occupancy indicating signal and for dynamically adjusting this priority to reflect an incipient overflow of the memory.

Another feature of an embodiment of the present invention is the provision of means for indicating that an information unit has been lost because of an overflow. In a preferred embodiment an indication of overflow is stored in one of the information units sent to the receiver.

DETAILED DESCRIPTION OF THE SPECIFIC EMBODIMENT

Figure 1:
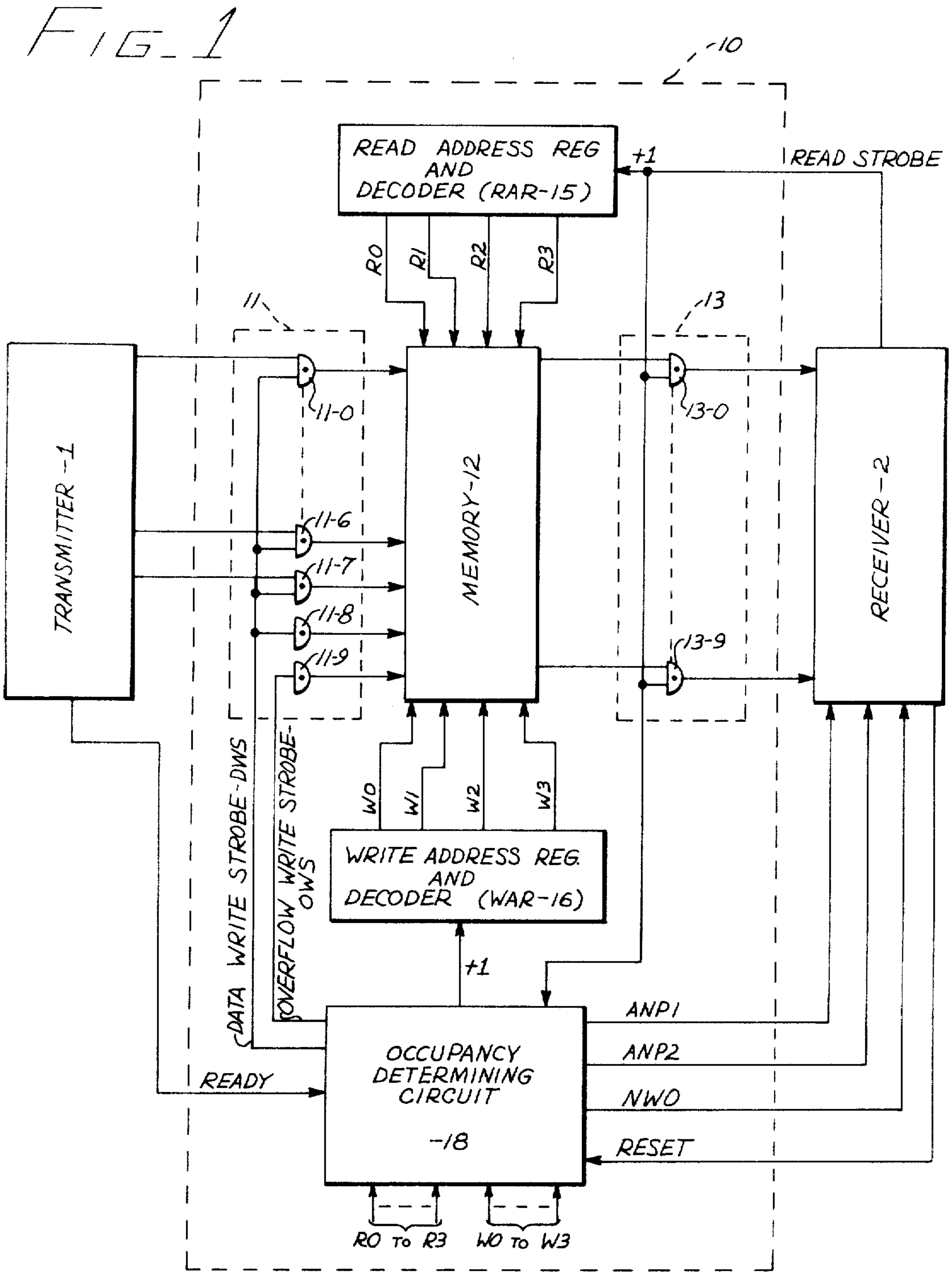
FIG. 1 is a block diagram showing the general organization of an embodiment of the invention.

FIG. 1 shows in simplified block diagram form the general organization of the buffer memory system of the present invention. A digital data transmitter 1 transmits data through the buffer memory system indicated generally at 10 wherein memory 12 provides temporary storage of information units including the data, and then couples the information units to digital receiver 2. Transmitter 1 and receiver 2 could be a real time source of data and an interruptable data processor respectively. Alternatively transmitter 1 and receiver 2 could be a non-real time or holdable source such as a data processor and an output device such as a line printer.

In the specific embodiment shown in FIG. 1, transmitter 1 is a 2-channel multiplexed real time source producing in sequence data characters consisting of seven parallel data bits. Along with the seven data bits, transmitter 1 produces a channel indicating signal which is a "1" while data is being produced by one channel and a "0" while data is being produced by the other. In addition, transmitter 1 forms a ready signal as a "1" on a separate ready line each time that it is ready to couple a data character to buffer system 10. The seven data bits and the channel indicating bit are coupled from transmitter 1 to write gating element 11 shown within 10. Write gating element 11 comprises 10 AND gates 11–0 through 11–9. AND gates 11–0 through 11–7 each have one input coupled to transmitter 1 to receive therefrom the seven bits of the data character and the channel indicating bit. To simplify the drawing AND gates 11–1 through 11–5 are not shown and their existence is suggested by a dotted line.

The ready signal produced by transmitter 1 is coupled to occupancy determining circuit 18 shown at the bottom of 10. Occupancy circuit 18 forms an important part of the present invention and the internal construction of its preferred embodiment will be described in connection with FIG. 2. For purposes of understanding FIG. 1, it is only necessary to know that occupancy circuit 18 is responsive to the writing into and reading from memory 12 to form indicating signals that reflect the occupancy status of memory 12 that are useful in controlling the flow of data. Two of these signals are a data write strobe and an overflow write strobe, which are coupled to write gating element 11 on the lines shown as DWS and OWS.

The outputs of AND gates 11–0 through 11–9 produce an information unit which is coupled to memory 12. The information unit consists of the seven data bits and the channel indicating bit from transitter 1 and two other control bits. Memory 12 has four addressable locations for storing up to four different information units. Although in this specific embodiment there are four addressable locations within memory 12, other embodiments of the invention could have a larger or smaller number of addressable locations. The number of addressable locations is selected on the basis of the expected number of information units that will be written into memory 12 before receiver 2 will be ready to accept data. Furthermore, while in the specific embodiment each information unit comprises seven data bits and three control bits, it should be understood that the present invention has application to information units of arbitrary composition and length. For example, the number of data bits per character could be larger or smaller depending upon the type of device used as transmitter 1 in which case more or fewer AND gates would be provided within write gating element 11. Memory 12 could be of any standard construction but in the specific embodiment, memory 12 is constructed from a plurality of integrated circuit registers because of the high speed with which such registers can transfer signals.

The particular location within memory 12 that will store an incoming information unit is selected by write address register and decoder WAR–16. The details of the internal construction of WAR–16 need not be given here since address register and decoder circuits are known in the art. It is sufficient to mention that WAR–16 includes an address register controllable to define in sequence a different one of a plurality of states equal in number to the number of addressable locations within memory 12. Thus, each state of the address register can be said to point to one of these addressable locations. The decoding circuitry within WAR–16 is responsive to the state of the address register to form an enabling signal on one of the output lines of WAR–16. Thus, WAR–16 has four separate output lines shown as WO through W3 for coupling an address signal to memory 12.

It should now be understood that when transmitter 1 is ready to transmit it will couple seven data bits and a channel indicating bit to write gating element 11 and a ready signal to occupancy circuits 18. If there is an empty location within memory 12 occupancy circuits 18 will respond to the ready signal to apply a "1" as a data write strobe signal to AND gates 11–1 through 11–8 on the DWS line and a "0" to AND gate 11–9 on the OWS line. The data write strobe signal will enable the individual AND gates 11–0 through 11–7 to write the seven data bits and the channel indicating bit supplied by transmitter 1 into the particular location in memory 12 selected by a signal on one of the lines WO through W3. The "1" signal on the DWS line will also be coupled through AND gate 11–8 to write a "1" into the corresponding bit position of the memory location and the "0" signal on the OWS line will cause a "0" to be written into that corresponding bit position thereby indicating that the information unit being written therein comprises a data character received from transmitter 1.

After the information unit has been stored into memory 12, occupancy circuit 18 will again make a determination of whether memory 12 is full. If it is not, occupancy circuit 18 couples a control signal to WAR–16 to increment by one state the controllable address register therein. Therefore WAR–16 will now point to a different location of memory 12 wherein the next sequentially produced information unit can be stored.

Also shown within 10 are read address register and decoder RAR–15 and read gating element 13 which are responsive to a demand from receiver 2 to cause the reading out of a stored information unit and the coupling of this information unit to receiver 2. RAR–15 can be identical in construction to WAR–16 and will include an address register defining four different states for pointing to the four addressable locations of memory 12. Four lines (R–0 through R–3) are shown coupling RAR–15 to memory 12. An enabling signal will be formed on one of these lines corresponding to the state of the address register within RAR–15 to select the particular location in memory 12 that will be coupled to read gating element 13.

The R0 through R3 outputs of RAR–15 and the W0 through W3 outputs of WAR–15 are also coupled to occupancy circuit 18. Responsive to these outputs, which are indicative of the relative states of the two address registers, occupancy circuit 18 selectively applies a low priority attention needed signal (ANP1), a high priority attention needed signal (ANP2) and a next word occupied signal (NW0) to receiver 2.

After receiver 2 has been notified that memory 12 contains an information unit by virtue of receiving an attention needed signal, receiver 2 produces a read strobe signal when it is ready to demand an information unit. This read strobe pulse is coupled to one of the two inputs of each of AND gates 13–0 through 13–9 within read gating element 13. The other input of each of AND gates 13–0 through 13–9 is coupled to memory 12 to receive therefrom the information unit stored therein that is currently pointed to by RAR–15. Thus, when the read strobe signal is received the ten AND gates 13–0 through 13–9 are enabled to read out the selected information unit and couple it to receiver 2. The read strobe signal is also coupled to RAR–15 to cause the controllable address register therein to increment one state so as to point to the next addressable location of memory 12 from which an information unit will be read.

Consider now several different sequences of events in the operation of the buffer memory system. Initially WAR–16 and RAR–15 are both set (by means not shown) so that they point to the same location in memory 12. For example, if the first location is being pointed to, then the W0 and R0 lines will carry a "1" signal. Now when transmitter 1 provides data and sends a ready signal, occupancy circuit 18 will produce a "1" signal on the DWS line and thereby enable write gating element 11 to write an information unit containing the transmitted data into the first location of memory 12. Immediately thereafter, occupancy circuit 18 will produce a signal on the +1 line coupled to WAR–16 and cause the address register therein to increment by one state so as to point to the second location in memory 12. Now there will be a "1" signal formed on the W1 output line of WAR–16 which is coupled back to occupancy circuit 18.

Occupancy circuit 18 will respond to the difference in states between WAR–16 and RAR–15 which is indicated by the "1" signal on the R0 line and the "1" signal on the W1 line to couple a first priority attention needed signal to receiver 2 on the ANP1 line.

Assume for the first example that receiver 2 responds to the attention needed signal before transmitter 1 is again ready to transmit data. Receiver 2 applies a signal on the read strobe line to read gating element 13 to enable the ten AND gates therein to respond to the information unit stored in the first location as pointed to by RAR–15 and to couple this information unit to receiver 2. The read strobe is also coupled to RAR-15 to cause the address register therein to increment by one state. Therefore at the end of this read operation both WAR-16 and RAR-15 will again be pointing to the same location; although now they are both pointing to the second location in memory 12. Occupancy circuit 18 will now respond to the equality of states in WAR-16 and RAR-15 to remove the attention needed signal.

Assume for a second example that RAR-15 is in state zero and that WAR-16 is in state one. Assume that receiver 2 temporarily ignores the low priority attention needed signal ANP1 and that transmitter 1 provides data again before receiver 2 is ready to demand the information unit stored in the first location of memory 12. Now when transmitter 1 produces data and sends a ready signal, write gating element 11 will write an information unit into the second location of memory 12 which is pointed at by the WAR-16. Then occupancy circuit 18 will again produce a signal on the +1 line and thereby cause WAR-16 to point to the third location. Since it now points to the third location, WAR-16 will produce a "1" on the W2 line. Since in this example receiver 2 has not yet demanded the information unit in the first location there are now two information units stored in memory 12. Occupancy circuits 18 will reflect this fact by producing a "1" signal on the next word occupied signal line NW0 which is coupled to receiver 2. Receiver 2 is designed to recognize this indication and automatically generate two consecutive strobe signals on the read strobe line so as to read out the two information units stored in memory 12.

Consider for a final example that transmitter 1 transmits data five consecutive times while receiver 2 is unavailable to demand an information unit. An information unit will be written into memory 12 and WAR-16 will be incremented to point to the next location for each of the first three times that data is transmitted by transmitter 1. Now there will be only one remaining location in memory 12 which is available for storing an information unit comprising data from transmitter 1. At this point occupancy circuit 18 will produce the high priority attention needed signal on the ANP2 line to notify the receiver 2 that it is imminent that memory 12 will become full. Receiver 2 is designed to recognize this signal as a higher priority interrupt.

Assume for this example that for some reason receiver 2 temporarily ignores even this higher priority signal on ANP2 and continues to handle some other process. Now when transmitter 1 supplies data for the fourth time, an information unit will be written into the fourth location and memory 12 will become full. Occupancy circuit 18 will recognize that memory 12 has been filled and therefore it will not develop a signal on the +1 line to WAR-16 and of course WAR-16 will not be incremented to point to the next location.

Now when transmitter 1 produces data and a ready signal for the fifth time, occupancy circuit 18 will produce a "1" signal on the OWS line instead of on the DWS line. Therefore AND gates 11-O through 11-8 will not be enabled and the new data will not overwrite the data already stored in the fourth memory location. However AND gate 11-9 will respond to the "1" signal on the overflow write strobe line to write a "1" control level into the corresponding bit position of the fourth memory location. A "1" control level or bit in this bit position indicates that an overflow error condition exists and appropriate corrective action must be taken. Thus when receiver 2 finally becomes available to demand information units from buffer system 10 and causes the sequential readout of the information units it will be notified that an overflow occurred by virtue of this "1" control level in the corresponding information unit.

Figure 2:
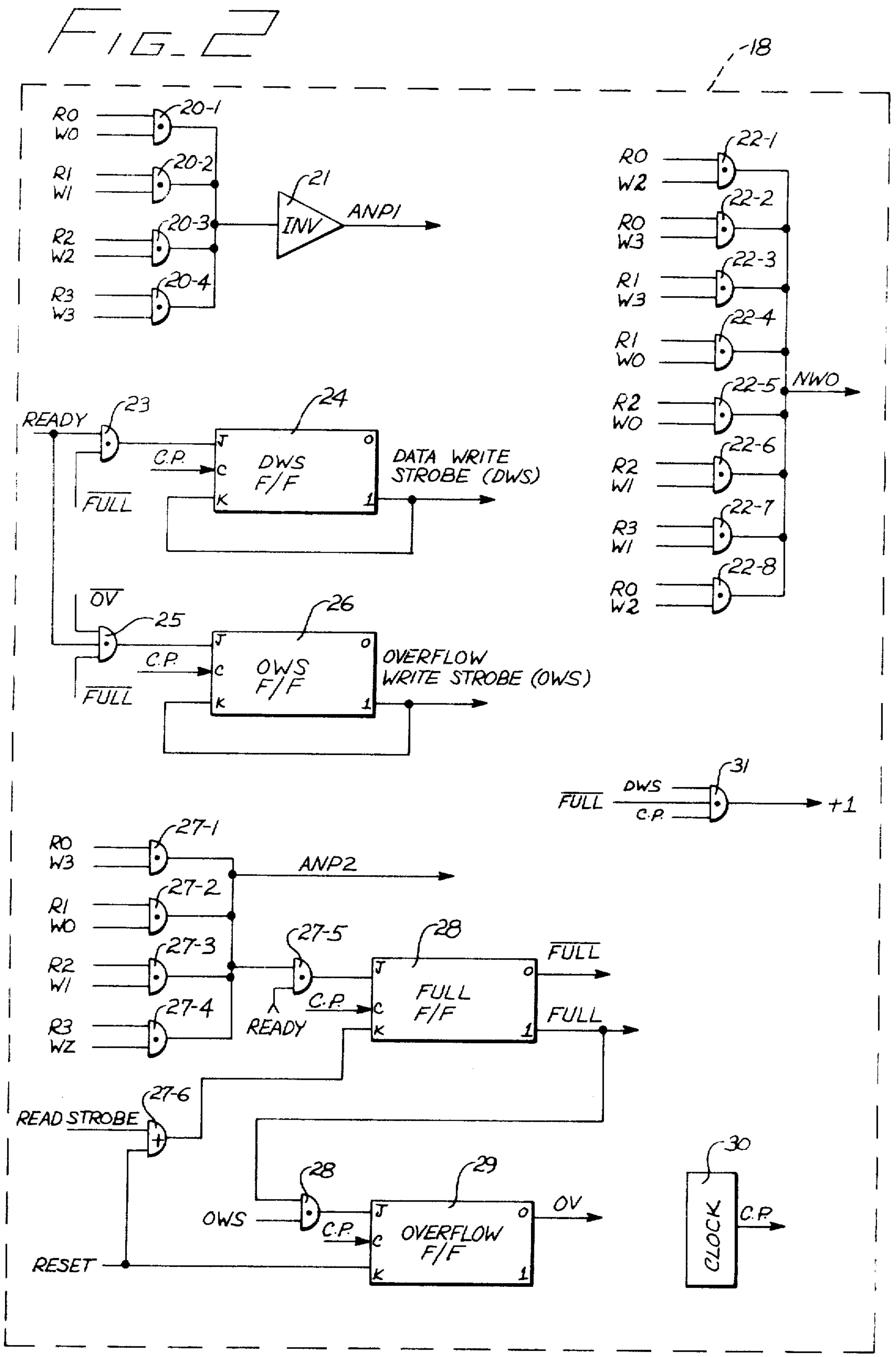
FIG. 2 is a block diagram showing the internal construction of a specific embodiment of the occupancy determining circuit of FIG. 1.

Consider now the internal construction of the preferred embodiment of occupancy circuit 18 which appears in FIG. 2. Consider first the types of circuit elements used. The flip-flops, DWS-24, OWS-26, Full F/F 28, and Overflow F/F 29 are clocked, J/K type, integrated circuit flip-flops. The AND gates, shown as semi-circles with an interior dot are of the stranded wired OR type. That is, when the outputs of two such AND gates are wired directly together the signal appearing at the common output is the logical OR function of the two AND functions. Inverter 21 is a standard logical inverter that produces at its output the logical complement of its input. OR gate 27-6 shown as a semicircle with an interior plus sign is a standard OR gate. Clock 30 is a standard free running oscillator circuit producing a continuous stream of pulses indicated in the drawing as C.P. It should be noted here that although in this specific embodiment occupancy circuit contains its own clock, it could easily be modified to be responsive to an external source of clock pulses. Furthermore, other embodiments of the occupancy circuit 18 could be constructed and perform the same function without the use of a clock. A clock is used in the preferred embodiment because the logical circuitry is simplified in that race problems are more easily avoided by using clocked circuits.

Consider now the circuits that produce the low priority attention needed signal for coupling to receiver 2 on the ANP1 line. AND gates 20-1, 20-2, 20-3, and 20-4 have their outputs coupled together in the wired OR connection and their common output is connected to the input of inverter 21. The inputs to AND gate 21-1 are the R0 signal from WAR-16 and the W0 signal from RAR-15. Thus if either the R0 signal or the W0 signal, but not both, is a "1" then the output of inverter 21 which is connected to the ANP1 line will be a "1". Thus it can be seen that a low priority attention needed signal is coupled to receiver 2 while WAR-16 points to the location addressed by W1 and RAR points to the location addressed by R0. On the other hand, when both W0 and R0 are equal to "1" the ANP1 line will carry a "0". Thus it can be seen that when both WAR-16 and RAR-15 point to the first location, which is one of the possible conditions when there are no information units stored in memory 12, occupancy circuit 18 will not produce the low priority attention needed signal. Similarly when both WAR-16 and RAR-15 point to either the second, third or fourth locations, occupancy circuit 18 should not produce an attention needed signal. To that end, the inputs to AND gate 20-2 are R1 and W1; the inputs to AND gate 20-3 are R2 and W2; and the inputs to AND gates 20-4 are R3 and W4. Thus it should be understood that AND gates 20-1 through 20-4 operate as a comparator to compare the states defined by WAR-16 and RAR-15 and they develop an attention needed signal whenever, but only when, WAR-16 points to a different memory location from the location pointed to by RAR-15.

Consider now the circuits that develop the next word occupied signal, indicated in FIG. 2 as NW0. These circuits consist of eight AND gates identified as 22-1 through 22-8 which are connected together in the wired OR configuration. The next word occupied signal will be a "1" whenever WAR-16 assumes a state that differs by at least two from the state assumed by RAR-15. For example, the inputs to AND gate 22-1, which are R0 and W2, will both be equal to "1" when WAR-16 is two states ahead of the state defined by RAR-15. Under these circumstances AND gate 22-1 will respond to form a "1" signal on the NW0 line. Similarly, the inputs to AND gate 22-2, which are R0 and W3, will both be equal to "1" when WAR-16 is three states ahead of the state defined by RAR-15. Therefore AND gate 22-2 produces a "1" signal on the NW0 line under these circumstances. The operation involving AND gates 22-3 to 22-8 for the other states of the RAR-15 will be evident from an examination of these gates in FIG. 2.

Consider now the circuitry that produces the high priority attention needed signal on the ANP2 line. AND gates 27-1, 27-ANP2 line. " " 27-3, and 27-4 are connected together in the wired OR configuration and their common output is connected to the ANP 0 LINE. The inputs to AND gate 27-1 are R0 and W3; to AND gate 27-2 are R1 and W0; to AND gate 27-3 are R2 and W1; and to AND gate 27-4 are R3 and W2. Recall that the high priority attention needed signal is produced whenever memory 12 contains three information units and has only one remaining location for storing another information before it becomes full. This memory occupancy status will be reflected by WAR-16 assuming a state that is three states ahead of the state defined by RAR-15. Thus when RAR-15 assumes the state in which R0 becomes a "1" and WAR-16 assumes the state which is three states ahead then W3 will also be a "1" AND gate 27-1 will respond to the two "1" inputs and supply a "1" signal on the ANP2 line. AND gates 27-2 to 27-4 provide a "1" output signal for the other possible condition wherein the WAR-16 is three states ahead of the RAR-15. This operation will be evident from an examination of the inputs in FIG. 2.

Figure 3:
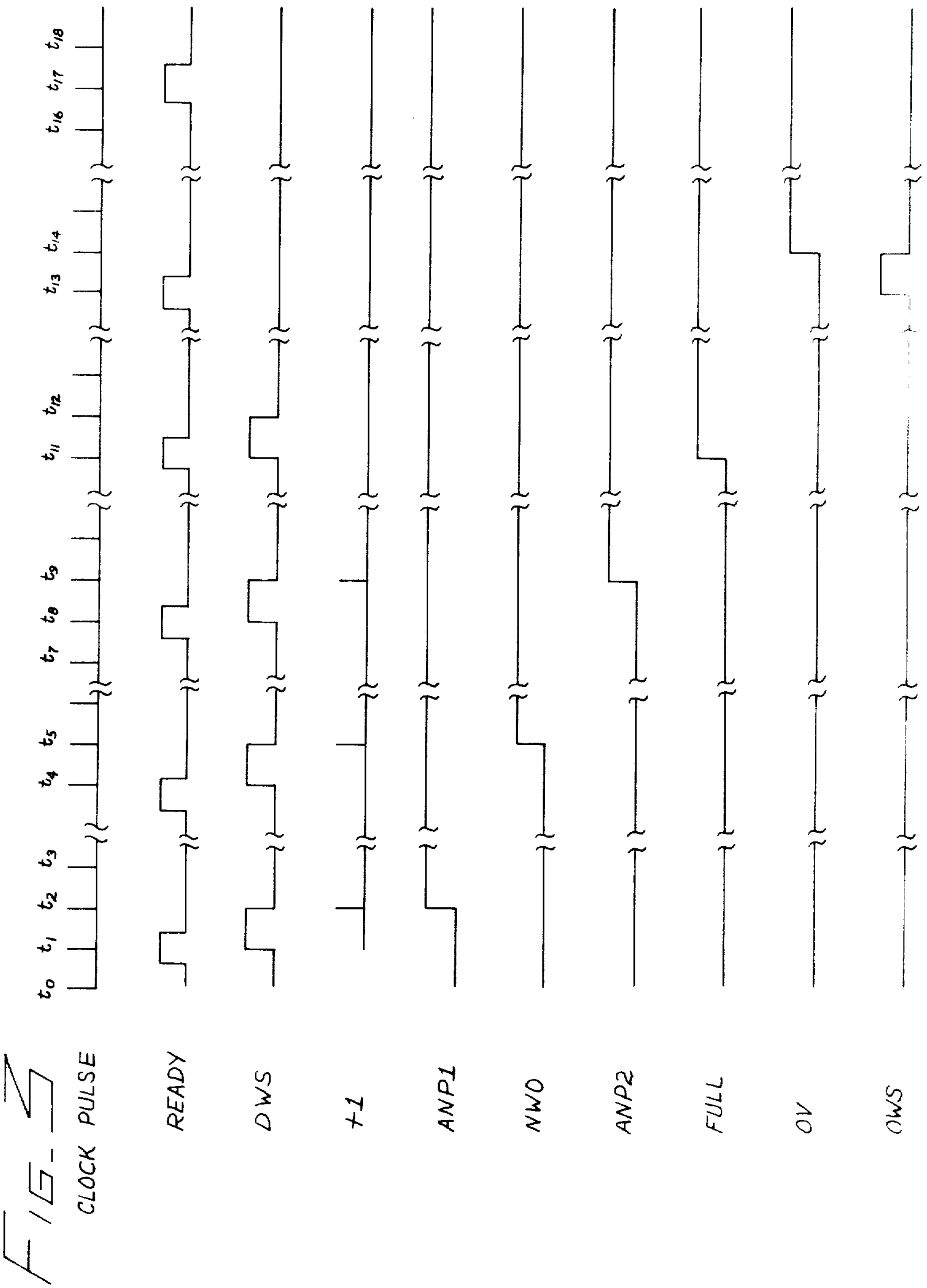
FIG. 3 is a timing diagram illustrating a specific example of the operation of the occupancy circuit of FIG. 2.

While considering the remaining circuitry in occupancy circuit 18, reference should also be made to FIG. 3 which is a timing diagram of the various signals relevant to this circuitry. FIG. 3 illustrates a sequence of operation wherein transmitter 1 transmits data six consecutive times before receiver 2 is available to demand an information unit. Although this example is somewhat aberrant in that this will not often occur in ordinary use, it has been selected for description because it fully illustrates the operation of the circuitry.

The clock pulses provided by clock 30 are illustrated at the top of FIG. 3. The individual pulses are labelled as $t_0$ through $t_{18}$. The clock pulses are regularly spaced and are used to clock the inputs to the four flip-flops 24, 26, 28 and 29. Note that the timing base lines in FIG. 3 are broken to indicate periods of time during which transmitter 1 is preparing to transmit data. Thus there may actually be many clock pulses occurring between $t_3$ and $t_4$ for example.

Consider now the circuitry within occupancy circuit 18 which produces the signal shown as DWS in FIG. 3 and which is coupled to writing gating element 11 of FIG. 1 on the DWS line. The DWS signal is formed by the "1" side output of DWS flip-flop 24. The DWS line is connected back to the K input of flip-flop 24. Thus whenever flip-flop 24 produces a "1" on the DWS line it thereby enables itself to be reset when the next succeeding clock pulse is received on its C input from the clock 30.

The J input to flip-flop 24 is coupled to the output of AND gate 23 which receives as inputs the ready signal coupled from transmitter 1 and the $\overline{\text{FULL}}$ signal coupled from the "0" side output of full flip-flop 28. The $\overline{\text{FULL}}$ signal will be a "1" as long as memory 12 is not full. Conversely the FULL signal will be a "0" during this time. Thus whenever transmitter 1 provides a ready signal while memory 12 is not full, AND gate 23 will be fully enabled and will supply a "1" to the J input of flip-flop 24. With its J input thus enabled, flip-flop 24 will be set by the clock pulse. Then on the next succeeding clock pulse flip-flop 24 will be reset.

As illustrated in FIG. 3, the DWS signal will become a "1" at $t_1$, $t_4$, $t_8$, and $t_{11}$ because immediately prior to the clock pulses occurring at those times both the ready signal and the $\overline{\text{FULL}}$ signals were equal to "1". The DWS signal returns to "1" in each case on the next succeeding clock pulse. That is at $t_2$, $t_5$, $t_9$, and $t_{12}$.

Consider now the OWS flip-flop 26 which produces the overflow write strobe. This signal is obtained from the "1" side output of flip-flop 26 and is coupled to write gating element 11 of FIG. 1 to cause AND gate 11-9 therein to write an overflow indicating bit into memory 12. The OWS line is also coupled back to the K input of flip-flop 26. Thus whenever flip-flop 26 produces a "1" on the OWS line it thereby enables itself to be reset when the next succeeding clock pulse is received on its C input from clock 30.

The J input to flip-flop 26 is coupled to the output of AND gate 25 which receives as inputs $\overline{\text{OV}}$ from the '0' side output of Overflow flip-flop 29, the ready signal from transmitter 1, and the FULL signal from the "1" of flip-flop 28. Thus when transmitter 1 produces a ready signal after memory 12 has been filled but has not overflowed, AND gate 25 will be fully enabled and will supply a "1" signal to the J input of flip-flop 26. With its J input thus enabled, flip-flop 26 will be set by the clock pulse. Then the next succeeding clock pulse flip-flop 26 will be reset.

As illustrated in FIG. 3, the OWS signal will become a "1" at $t_{13}$ because immediately prior to the clock pulse occurring at that time the ready signal, the FULL signal, and the $\overline{\text{OV}}$ signal are all equal to "1". The OWS signal returns to "0" on the next succeeding clock pulse occurring at $t_{14}$.

Consider now the +1 signal generated by occupancy circuit 18. The +1 signal is produced by AND gate 31 and coupled to WAR-16 of FIG. 1 to cause the address register therein to increment and point to the next location of memory 12 that will store an information unit. The inputs to AND gate 31 are the DWS signal, the clock pulse signal, and the $\overline{\text{FULL}}$ signal. As illustrated in FIG. 3, these three inputs will simultaneously be equal to "1" at $t_2$, $t_5$, and $t_9$.

Consider now FULL flip-flop 28 which is operative to generate and store an indication that memory 12 has become full. As illustrated in FIG. 3 the Full signal which is produced by the "1" side output of flip-flop 28 will be a "0" until time $t_{11}$ and a "1" thereafter.

The J input of flip-flop 28 is coupled to the output of AND gate 27-5 which receives as inputs the ready signal and the high priority attention needed signal on the ANP2 line. As shown in FIG. 3 the signal on the ANP2 line will become a "1" at $t_9$ because at that time memory 12 has received three information units. Now when the fourth of the six ready signals is received AND gate 27-5 becomes fully enabled and the clock pulse at $t_{11}$ causes flip-flop 28 to be set. The K input of flip-flop 28 is coupled to the output of OR gate 27-6 which produces a "1" when either its read strobe or reset input signals is equal to "1". FIG. 3 does not illustrate the resetting of flip-flop 28 because in the chosen example receiver 2 is not ready to demand an information unit and therefore does not couple either one of these signals to occupancy circuit 18.

Consider now Overflow flip-flop 29. The J input to flip-flop 29 is coupled to the output of AND gate 28 which receives as inputs the FULL and the OWS signals. Thus when both of these signals are "1" AND gate 28 enables the next clock pulse to set flip-flop 28. The K input of flip-flop 28 is coupled to the reset signal received from receiver 2. As illustrated in FIG. 3 flip-flop 28 will be set at $t_{14}$ because immediately prior to the clock pulse occurring at that time both the FULL and the OWS signals will be "1".

It should be noted that a number of modifications could be made to the specific embodiment described above which would be within the scope of this invention. For example, occupancy circuits 18 could include an up/down counter responsive to the writing into and reading from memory 12 as a means of developing an indication of the occupancy status of memory 12. The up/down counter could be counted up by one each time an information unit is written into memory 12 and could be counted down each time an information unit is read therefrom. Thus a count of zero could indicate an empty memory, a count of one could indicate the existence of one information unit in memory, and so forth. As another example, the states of WAR-16 and RAR-15 could be compared by the conventional process of complementing and adding. As is well known, this process is equivalent to a subtraction. When WAR-16 and RAR-15 point to the same location, the difference in their states is zero. Thus the complement and add circuitry would indicate that memory 12 is empty whenever it produced a zero result.

What is claimed is:

1. A buffer memory system comprising a memory having a plurality of addressable locations; means for writing digital data into and reading digital data from the locations on a first-in, first-out basis including means providing a ready indication when digital data is ready to be written into a location and individual write and read counting means identifying the locations for writing and reading respectively; means for indicating full and occupied relative counts of the counting means wherein the memory is full and contains digital data for reading respectively; means responsive to the occupied indication for providing an output signal; means responsive to the coincidence of the ready indication and the full indication for storing an indication of an overflow condition; and means for providing an output indication of the stored overflow indication together with digital data read from the memory.

2. A system according to claim 1 wherein each location includes a plurality of storage cells for storing digital data written therein and a further storage cell for storing an overflow indication, and including means for writing an overflow indicating signal into the further storage cell in a selected location, identified by the write counting means, so that digital data and the stored overflow indicating signal are provided simultaneously when the selected location is read.

3. In a digital data handling system for receiving data units from a transmitting device having a ready condition wherein it provides a data unit and for transferring the provided data units on demand to a receiving device operable to demand after receiving an indication that data units are available, a buffer system comprising:

means for receiving data units from the transmitting device;

means for receiving demand signals from the receiving device;

a memory having a plurality of addressable locations;

means for storing information units in the locations and means for reading out a stored information unit in response to each received demand signal;

the memory being full when each location stores an information unit that has not been demanded, each information unit including a received data unit and a signal indicating whether an overflow condition has occurred;

write counting means and read counting means for providing to the memory the addresses of the locations into which an information unit is to be written and from which an information unit is to be read respectively, the write counting means and the read counting means having a first predetermined relative count when at least one information unit is ready to be demanded and having a second predetermined relative count when the memory is full;

means for indicating to the receiving device that data units are available when the write and read counting means have the first predetermined relative count; and means operative when the transmitting device is in a ready condition when the write and read counting means have the second predetermined relative count to store an overflow indicating signal as a part of a selected information unit stored in the memory so that when the selected information unit is demanded the receiving device will be informed of an overflow condition.

4. A buffer system according to claim 3 including comparator means responsive to the write counting means and the read counting means for indicating when the write and read counting means have the first and the second predetermined relative counts;

a bistable device for storing an indication of whether the memory is full and settable to one state when the comparator means indicates the second predetermined count so as to indicate that the memory is full; and wherein the write counting means is operative to count in response to the coincidence of a control signal accompanying a received data unit and an indication provided by the bistable device that the memory is not full.

5. A buffer system according to claim 3 wherein each addressable location has storage means for storing a data unit and storage means for storing an overflow indicating signal, and wherein an overflow indicating signal is stored in a location selected by the write counting means.

6. In a digital data handling system for receiving data units from a transmitting device having a ready-to-transmit condition wherein it provides a data unit and for transferring on demand the provided data units to a receiving device having a ready-to-receive condition wherein it is operable to demand after receiving an indication that data units are available, a buffer system comprising:

a semi-conductor memory having a plurality of addressable registers;

a write address register and a read address register, each for storing a coded number pointing to a memory register and each operative to cycle so as to point one-by-one to the memory registers;

circuitry for writing one-by-one a sequence of data units received from the transmitting device into the memory registers pointed to by the write address register;

circuitry for reading out one-by-one a sequence of data units from the memory registers pointed to by the read address register;

the memory being full when each memory register stores a unit which has not been read out, an overflow condition arising when the transmitting device has a ready-to-transmit condition when the memory is full; and memory occupancy and overflow indicating circuitry including a comparator that indicates first and second predetermined differences in the coded numbers stored in the write and read address registers, circuitry responsive to the first predetermined difference for supplying to the receiving device an indication that data units are available, circuitry for detecting the coincidence of the second predetermined difference and a ready-to-transmit condition, means responsive to such detected coincidence for storing an overflow indication, and means for reading out and supplying the stored overflow indication to the receiving device when it is in a ready-to-receive condition.

7. A buffer system according to claim 6 wherein each addressable register includes a plurality of storage cells for storing a data unit and a further storage cell for storing an overflow indication, and including circuitry for writing an overflow indication into the further storage cell in the register pointed to by the write address register.

* * * * *